United States Patent
Day et al.

(10) Patent No.: US 7,401,069 B2
(45) Date of Patent: Jul. 15, 2008

(54) BACKGROUND INDEX BITMAPPING FOR FASTER QUERY PERFORMANCE

(75) Inventors: Paul Reuben Day, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 10/660,167

(22) Filed: Sep. 11, 2003

(65) Prior Publication Data

US 2005/0060293 A1 Mar. 17, 2005

(51) Int. Cl.
G06F 7/00 (2006.01)
G06F 17/30 (2006.01)

(52) U.S. Cl. .................. 707/3; 707/1; 707/2; 707/4; 707/5; 707/100; 707/101

(58) Field of Classification Search ............. 707/1–4, 707/100–101
See application file for complete search history.

(56) References Cited

U.S. PATENT DOCUMENTS

| | | | | | |
|---|---|---|---|---|---|
| 5,495,608 | A | * | 2/1996 | Antoshenkov | 707/3 |
| 5,560,007 | A | * | 9/1996 | Thai | 707/3 |
| 5,666,528 | A | * | 9/1997 | Thai | 707/102 |
| 5,845,276 | A | * | 12/1998 | Emerson et al. | 707/2 |
| 5,884,307 | A | * | 3/1999 | Depledge et al. | 707/7 |
| 5,987,453 | A | * | 11/1999 | Krishna et al. | 707/4 |
| 6,067,540 | A | * | 5/2000 | Ozbutun et al. | 707/3 |
| 6,105,020 | A | * | 8/2000 | Lindsay et al. | 707/2 |
| 6,134,546 | A | * | 10/2000 | Bestgen et al. | 707/4 |
| 6,141,656 | A | * | 10/2000 | Ozbutun et al. | 707/3 |
| 6,195,656 | B1 | * | 2/2001 | Ozbutun et al. | 707/4 |
| 6,266,662 | B1 | * | 7/2001 | Ozbutun et al. | 707/3 |
| 6,757,670 | B1 | * | 6/2004 | Inohara et al. | 707/3 |
| 6,778,996 | B2 | * | 8/2004 | Roccaforte | 707/101 |
| 6,996,556 | B2 | * | 2/2006 | Boger et al. | 707/3 |
| 6,999,958 | B2 | * | 2/2006 | Carlson et al. | 707/3 |
| 2004/0039729 | A1 | * | 2/2004 | Boger et al. | 707/2 |
| 2004/0181514 | A1 | * | 9/2004 | Santosuosso | 707/3 |
| 2004/0225639 | A1 | * | 11/2004 | Jakobsson et al. | 707/2 |
| 2005/0187917 | A1 | * | 8/2005 | Lawande et al. | 707/3 |

* cited by examiner

*Primary Examiner*—John Cottingham
*Assistant Examiner*—Michael D Pham
(74) *Attorney, Agent, or Firm*—Wood, Herron & Evans, LLP

(57) ABSTRACT

A database engine and a system running a database engine utilize a dynamic bitmap updating routine to avoid the delay associated with building an entire bitmap. When running a query on a table, the database engine can build a bitmap over a column of the table that helps avoid unnecessary I/O operations to retrieve records. The database engine initializes the bitmap so that all elements have a value of "1", or active, and proceeds to scan and retrieve the records of the table according to the bitmap using a first process. Any retrieved record is further analyzed to determine if it is part of the result set. Concurrently, a second process is initiated which continually updates the values within the bitmap according to a set of selection criteria. As the first process continues to operate, more and more elements of the bitmap are set to "0", or inactive, so that the first process can avoid unnecessary I/O operations.

5 Claims, 2 Drawing Sheets

BACKGROUND INDEX BITMAPPING FOR FASTER QUERY PERFORMANCE

FIELD OF THE INVENTION

The invention relates to database management systems, and in particular, to query bitmapping utilized in such systems.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

One area that has been a fertile area for academic and corporate research is that of improving the designs of the "query optimizers" utilized in many conventional database management systems. The primary task of a query optimizer is to choose the most efficient way to execute each database query, or request, passed to the database management system by a user. The output of an optimization process is typically referred to as an "execution plan," "access plan," or just "plan" and is frequently depicted as a tree graph. Such a plan typically incorporates (often in a proprietary form unique to each optimizer/DBMS) low-level information telling the database engine that ultimately handles a query precisely what steps to take (and in what order) to execute the query. Also typically associated with each generated plan is an optimizer's estimate of how long it will take to run the query using that plan.

An optimizer's job is often necessary and difficult because of the enormous number (i.e., "countably infinite" number) of possible query forms that can be generated in a database management system, e.g., due to factors such as the use of SQL queries with any number of relational tables made up of countless data columns of various types, the theoretically infinite number of methods of accessing the actual data records from each table referenced (e.g., using an index, a hash table, etc.), the possible combinations of those methods of access among all the tables referenced, etc. An optimizer is often permitted to rewrite a query (or portion of it) into any equivalent form, and since for any given query there are typically many equivalent forms, an optimizer has a countably infinite universe of extremely diverse possible solutions (plans) to consider. On the other hand, an optimizer is often required to use minimal system resources given the desirability for high throughput. As such, an optimizer often has only a limited amount of time to pare the search space of possible execution plans down to an optimal plan for a particular query.

Even with optimized plans and other improvements, query performance during execution can be adversely impacted by a number of factors. One of the greatest contributors to poor performance is input/output (I/O) operations to retrieve records from mass storage. Retrieving records from memory for further analysis as part of the query is a time consuming process and retrieving them from storage devices such as disk drives and other non-volatile memory has an even greater impact on performance.

One recent development in increasing performance of executing database queries has been the introduction of a bitmap. A bitmap consists of a vector of 1-bit elements in which each element corresponds to a row of a table. Bitmaps are particularly useful in searching table columns over which an index has been built for a particular selection criteria. In operation, the database engine, while executing a query, typically scans the index and then builds the bitmap by setting each bitmap element to either a "1" or a "0" depending on whether the value in the corresponding row of that column satisfies the selection criteria. A "1" typically indicates that the selection criteria is satisfied while a "0" indicates otherwise. Alternatively, the meaning associated with these values could be reversed without complicating the use of a bitmap. The bitmap operates the same, regardless of the specific values used, if one value is considered to be "active" and another state is considered to be "inactive".

Thus, by using a bitmap, the database engine can not only forego testing records having "0" entries to see if they satisfy selection criteria, but can entirely avoid retrieving these records at all. As a result, I/O activity, one of the leading factors in slowing query performance, can be significantly reduced.

One drawback to the use of bitmaps, however, is that during execution of the query, records can not be retrieved and the result set returned until the bitmap is completely built. Thus, the use of bitmaps can introduce a start-up delay before a query begins returning records to a user.

For example, it has been found that for a table of around one million records, the building of a bitmap from an index can introduce a delay of around 10 seconds or more. Because of this delay period, once a user submits a query, no feedback is initially provided to the user that the query is returning results or even running properly. This situation causes a perception that the query is slow or causes confusion about whether the database engine is even running. Accordingly, there is an unmet need in the prior art for utilization of bitmaps during query execution in a way which avoids the start-up delay of building the bitmap, thereby providing search results to a user a soon as possible.

SUMMARY OF THE INVENTION

Embodiments of the present invention utilize a bitmap to reduce unnecessary I/O operation but can also provide matching records back to a user without the typical delay period needed to build the complete bitmap. Accordingly, the user receives immediate feedback to submitting a query but also enjoys the performance enhancement of using a bitmap to reduce unnecessary I/O.

One aspect of the present invention relates to an apparatus for executing a query. According to this aspect, the apparatus includes at least one processor; a memory coupled with the at least one processor; and a database engine residing in the memory and executed by the at least one processor. In particular, the database engine is specifically configured to initialize each element of a bitmap, corresponding to a table, to an active value; retrieve records of the table according to the bitmap; and concurrently with retrieving the records, update individual elements of the bitmap according to a portion of the query.

Another aspect of the present invention relates to a computer-readable medium bearing instructions for reducing input/output activity while executing a query, said instructions being arranged, upon execution thereof, to cause one or more processors to perform a number of steps. In particular, when executed, the steps include a) executing the query on a plurality of table entries in a table using a bitmap having a respective element associated with each table entry; b) concurrently with executing the query, generating the bitmap by initially setting all elements to an active value, and selectably setting respective elements that are associated with entries that do not satisfy a portion of the query to an inactive value; and c) avoiding retrieval of a table entry after its corresponding bitmap element is set to an inactive value.

A further aspect of the present invention relates to a method for executing a query that evaluates one or more records of a table according to predetermined selection criteria. According to this aspect, a bitmap is initialized wherein each element of the bitmap corresponds to a record of the table and each element is initialized to an active value. Next, a first task executes that individually retrieves each of the one or more records from storage according to whether the corresponding element of the bitmap has an active value. Also, concurrent with the first task, a second task updates the bitmap by setting to an inactive value the respective element of the bitmap corresponding to any record that does not satisfy at least a portion of the selection criteria. Furthermore, the first task continues to run until all records from the table, having a corresponding active-value bitmap element, have been retrieved from storage.

Yet another aspect of the present invention relates to a method for reducing input/output activity when running a database query. In accordance with this aspect, a query is executed on a plurality of table entries in a table using a bitmap having a respective element associated with each table entry. Concurrently with executing the query, a bitmap is generated by initially setting all elements to an active value and is maintained by selectably setting respective elements that are associated with entries that do not satisfy a portion of the query to an inactive value. Consequently, retrieval of a table entry is avoided after its corresponding bitmap element is set to an inactive value.

DETAILED DESCRIPTION

As mentioned above, the embodiments discussed hereinafter utilize a database engine and optimizer framework that support the dynamic updating of bitmap information. The bitmap is used by the database engine to quickly identify records having an inactive value in the bitmap; thus, identifying those records of the table which fail to match a portion of the query's selection criteria and can be discarded by the database engine without performing an I/O operation. By initializing at least a portion of the bitmap to all active values, the database engine will retrieve each of the corresponding records to test against the selection criteria. As a result, some records are unnecessarily retrieved and tested but some records will likely be returned to the user almost immediately. Concurrent with that activity, the bitmap values are updated with their correct values. Thus, as more and more updating occurs, the appropriate bitmap elements are changed from an active value to an inactive value and the database engine avoids unnecessary I/O operations. Consequently, the database engine enjoys the performance benefit of having a bitmap available while avoiding the start-up delay that is encountered when initially building traditional bitmaps. A specific implementation of such a database engine and optimizer framework capable of supporting bitmapping in a manner consistent with the invention will be discussed in greater detail below. However, prior to a discussion of such a specific implementation, a brief discussion will be provided regarding an exemplary hardware and software environment within which such a framework may reside.

Hardware/Software Environment

Figure 1:
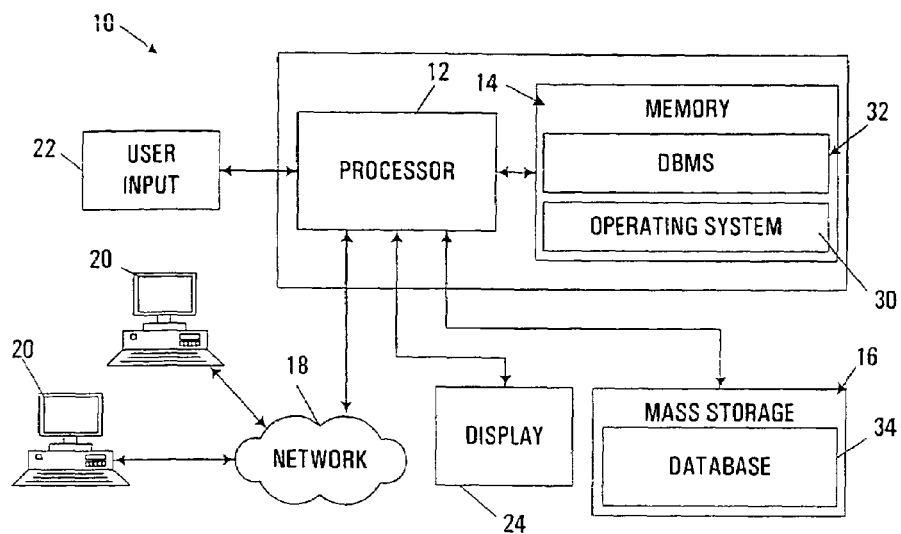
FIG. 1 is a block diagram of a networked computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management system incorporating dynamic bitmap updating consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

Figure 2:
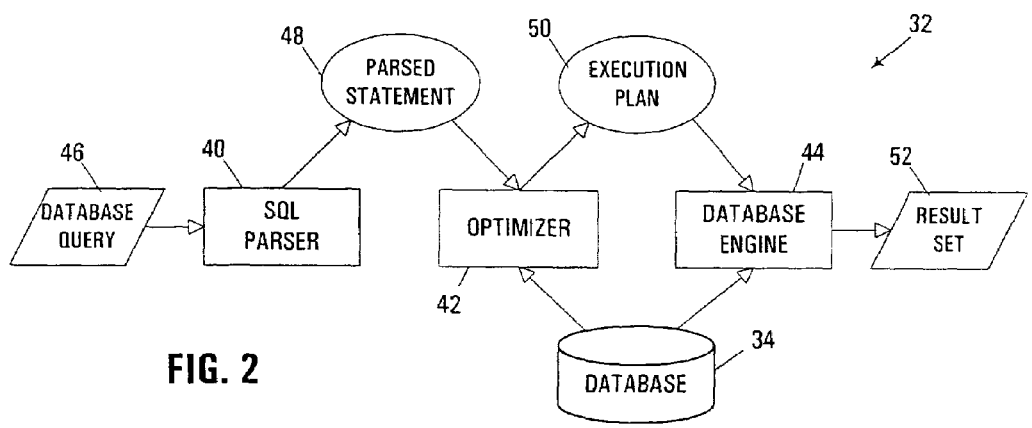
FIG. 2 is a block diagram illustrating the principal components and flow of information therebetween in the database management system of FIG. 1.

Turning briefly to FIG. 2, an exemplary implementation of database management system 32 is shown. The principal components of database management system 32 that are relevant to query optimization are an SQL parser 40, optimizer 42 and database engine 44. SQL parser 40 receives from a user a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated, often using data such as platform capabilities, query content information, etc., that is stored in database 34. Once generated, the execution plan is forwarded to database engine 44 for execution of the database query on the information in database 34. The result of the execution of the database query is typically stored in a result set, as represented at block 52.

Other components may be incorporated into system 32, as may other suitable database management architectures. Other database programming and organizational architectures may also be used consistent with the invention. Therefore, the invention is not limited to the particular implementation discussed herein.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Dynamic Bitmap Updating

According to embodiments of the present invention, the database engine initiates execution of a query by generating a bitmap and setting all of its elements to "1". Thus, initially, all the records are set to be retrieved for further analysis. Additionally, a concurrent process is also started which scans the index related to the selection criteria and changes appropriate bitmap elements to "0". One alternative to setting all the bitmap elements to an active value is to merely set a plurality of the bitmap elements to "1". These plurality of elements would correspond to the first records the database engine retrieves and would be of sufficient size to allow the concurrent process to complete.

Initially, each record encountered by the database engine will have a corresponding bit map element of "1" and will be retrieved and tested against the selection criteria. However, the longer the background process runs, the more bitmap elements will be set to "0", thereby preventing unnecessary I/O operations.

The determination of which queries may benefit from such dynamic bitmap updating can be performed by an optimizer. During development of the access plan, or plan, for a query, the optimizer can consider a number of factors to evaluate different queries. For example, the optimizer can consider the size of a table, the availability of an index over a column of the table, and the selectivity provided by that index. For example, the performance impact to a query involving a few hundred records would be almost imperceptible to a user and, therefore, may indicate that dynamic bitmap updating may be unnecessary. Also, the absence of an appropriate index would effectively preclude any I/O savings and, thus, suggest that dynamic bitmap updating would not necessarily be beneficial. As for index selectivity, if the bitmap has a "1" value for every 2 out of 3 records, for example, as opposed to every 1 out of 100, then the selectivity of the bitmap may not be sufficient to warrant dynamic bitmap updating. Other possible considerations are whether the query will run on a multiprocessor system, whether parallel tasks are supported, and the available memory and other system resources. Thus, while optimization is taking place, the optimizer can indicate whether a particular query is a query that will benefit from dynamic bitmap updating during execution.

One of ordinary skill will easily recognize that the thresholds for table size, available memory, index selectivity, and the other criteria can vary from one computer platform to another. So, although default values can be programmed initially, heuristics or manual observation can be utilized to determine optimum settings for each particular computing platform to allow revising these thresholds accordingly.

General Method for Dynamic Bitmap Updating

Figure 3:
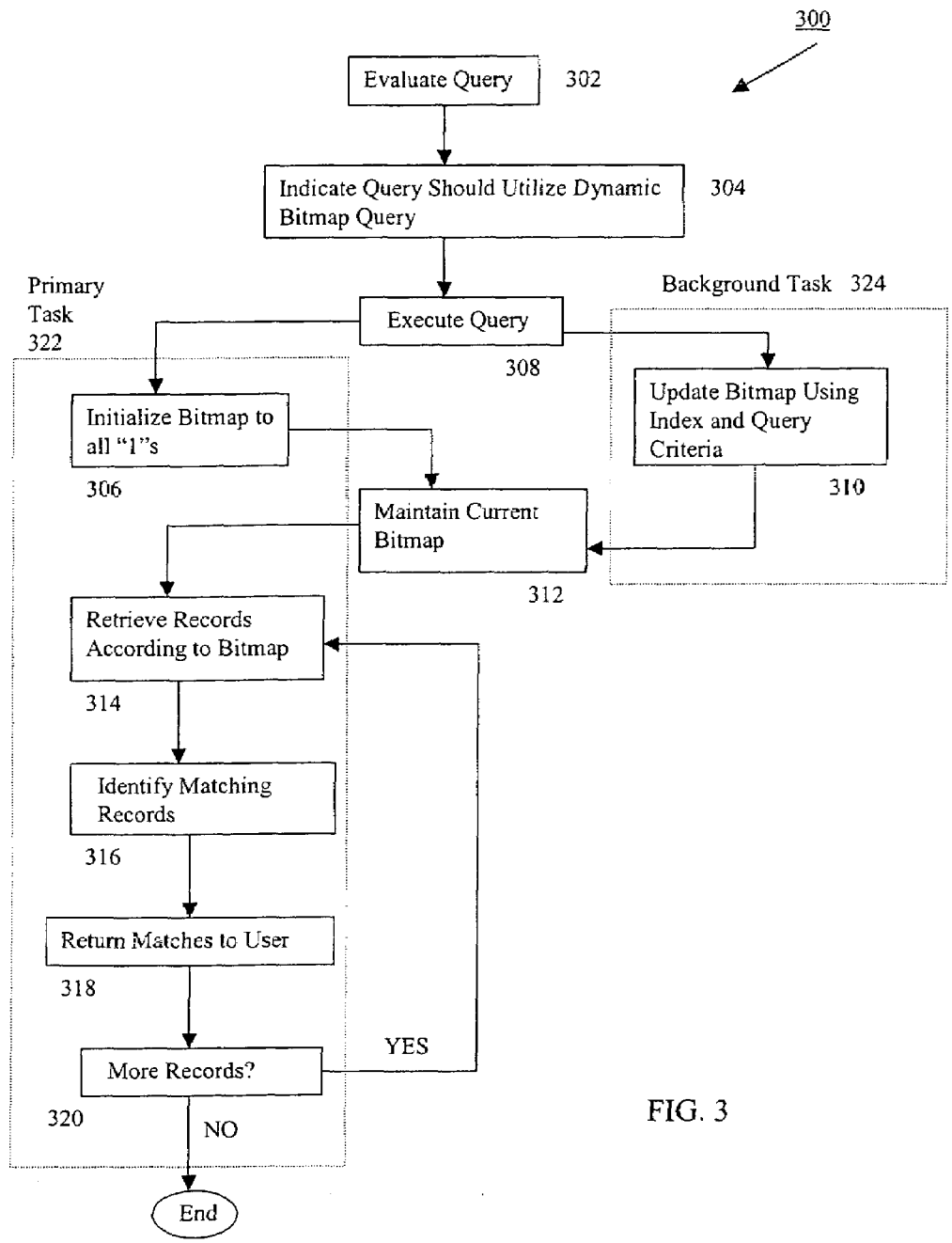
FIG. 3 illustrates a flowchart for performing dynamic bitmap updating according to exemplary embodiments of the present invention.

The flowchart depicted in FIG. 3 illustrates a general method by which a query optimizer and database engine can improve query performance by using a dynamically updated bitmap while avoiding any initialization penalty for generating the bitmap.

In step 302, an optimizer can analyze different queries when developing the query plan to determine which queries are candidates for dynamic bitmap updating. Those queries matching the predetermined characteristics can be labeled or otherwise indicated, in step 304, as such. Once the query plan is developed, the optimizer can forward the plan to the database engine, or execution engine, to perform the query according to the plan.

In step 308, the database engine executes the query labeled as a candidate for dynamic bitmap updating by starting a first process 322 which initializes, in step 306, a bitmap so that all, or at least a plurality, of the elements are set to "1". Concurrently, a second process 324 is initiated as well. The second process 324 uses an appropriate index to update, in step 310, the elements of the bitmap according to the selection criteria of the query.

Thus, in step 312, a bitmap is maintained that is initially set to all "1"'s but which is dynamically updated as the second process 324 runs. As previously indicated, the purpose of the updating is to set elements of the bitmap to "0" according to the index.

In step 314, the database engine utilizes the values of the bitmap to determine whether or not to retrieve a record for further analysis. The value of the corresponding element in the bitmap indicates to the database engine whether that record should be retrieved from storage, thus incurring an I/O operation, or can be ignored, thus avoiding an unnecessary I/O operation. For records which are retrieved, the database engine, in step 316, determines if the retrieved record satisfies the selection criteria of the query.

For records which do satisfy the criteria, they are returned, in step 318, to the user as part of a result set. This retrieval of records repeats in step 320 until all the records in the table have been scanned. It is apparent from the flowchart 300 that as the second process 324 continues to run, the current bitmap maintained in step 312 will periodically have more and more elements changed from a "1" to a "0" so that when step 314 is performed, the database engine can avoid I/O operations on records which do not satisfy the selection criteria indicated by the index of step 310. As a result, the user can start receiving records as part of the result set without waiting for the entire bitmap to be built yet still enjoy the performance benefits offered by use of a bitmap to avoid unnecessary I/O operations.

Exemplary Query

One exemplary query is provided below that has characteristics that are particularly suited to benefit from dynamic bitmap generation. The following query is provided by way of example only and it is understood that other queries are also contemplated that would benefit from dynamic bitmap updating as described herein.

Exemplary Table:

TABLE X

| Record # | Col1 | Col2 | Col3 |
|---|---|---|---|
| 1 | 8 | a | 10 |
| 2 | 6 | c | 20 |
| 3 | 7 | f | 30 |
| 4 | 3 | g | 33 |
| 5 | 1 | b | 10 |
| 6 | 9 | a | 44 |
| 7 | 0 | z | 55 |
| 8 | 2 | a | 44 |
| 9 | 4 | b | 33 |
| 10 | 5 | c | 22 |

Assumptions:
1) Ord_Ix is built over Col1 of table X for the <Order By> criteria
2) Sel_Ix is built over Col2 for the select criteria <not in ('a', 'b', 'c')>

Query:

```
SELECT Col1
  FROM X
  WHERE    Col2 NOT IN ('a', 'b', 'c')
           AND Col3 > 20
  ORDER BY Col1
```

This query involves a column, Col2, over which an index, Sel_Ix, has been built for a particular selection criteria. The query also includes an "Order By" predicate by way of example only. The inclusion of a "Group By" predicate would be similar in that it implicitly includes ordering the returned records before performing any grouping. One of ordinary skill will recognize that other query predicates and structures could be substituted.

The optimizer, when developing the query plan, would recognize that this query has a number of characteristics that suggest dynamic bitmap updating would prove beneficial and, therefore, indicates such to the execution engine. When executing this query, the database engine generates an appropriately sized bitmap for Col2 with all its elements set to "1". Concurrently, and in the background, the database engine spawns a task to scan the Sel_Ix index to update the bitmap by changing appropriate values to "0". This scanning of the index identifies which records of table X have a value in Col2 that meets the selection criteria (i.e., <not in ('a', 'b', 'c')>).

After initializing the bitmap, the database engine can use the Ord_Ix to access the records in table X so that the results will be ordered. Thus, the database engine starts with record number 7 (i.e., Col1=0) and checks its corresponding bitmap element to determine if it is a "1" or a "0".

For each record from table X, if the corresponding element in the bitmap is on, or active, then the database engine retrieves that record for table X and tests both the Col2 and Col3 selection criteria. Both selection criteria are checked because a "1" in the bitmap may mean that the Col2 is satisfied or it may simply mean that the background process has not progressed to checking this record's entry in the Sel_Ix index. Accordingly, both selection criteria are checked. However, when the database engine encounters a record with a "0" value in the bitmap (as a result of the background process), the database engine can discard that record without performing I/O to retrieve the record from storage and move on to the next record. The database engine then proceeds with record number 5 (i.e., Col1=1) and so on until all records in table X are scanned and analyzed.

The use of Ord_Ix to scan the bitmap in the order of Col1 values and the use of the Sel_Ix index to update the bitmap values results in the bitmap being updated in an apparently random manner. In other words, if the order of records according to Col1 is considered to be "top-to-bottom", then the bitmap is not updated in "top-to-bottom" order but rather in a random order (assuming, of course, that the records have been entered in the table in substantially a random manner). Thus, even if the primary task and background task take the same time to run, the primary task will still avoid unnecessary I/O because corresponding bitmap elements will frequently be changed to "0" by the background task before the primary task scans that record.

Embodiments of the present invention can be used in a calibration mode in order to provide suggestions to a user about optimization strategies. In this mode, the database engine acquires performance statistics relating to a query running with normal bitmapping and the query running with dynamic bitmap updating. This query can be run on an entire table or a statistically meaningful portion of the table. If the performance increase is above a predetermined threshold (e.g., 10%), then the optimizer can suggest that the user consider creating a permanent encoded vector index over a column of table X (e.g., col2) instead of building and dynamically changing a bitmap each time the query is run.

Various modifications may be made to the illustrated embodiments without departing from the spirit and scope of the invention. Therefore, the invention lies in the claims hereinafter appended.

What is claimed is:

1. A computer-implemented method for executing a query that evaluates one or more records of a table according to predetermined selection criteria, comprising the steps of:
    optimizing a query plan for the query by labeling the query as a candidate query for dynamic bitmap updating, where optimizing the query plan for the query by labeling the query as a candidate query for dynamic bitmap updating further comprises before initializing a bitmap and startinq a first primary task and a second background task, determining if the query is labeled as the candidate query for dynamic bitmap updating;
    when the query is labeled as the candidate query for dynamic bitmap updating then executing the steps of:
    initializing a bitmap having a plurality of elements, each element of the bitmap corresponding to a record of the table, and each element initialized to an active value;
    running the first primary task that individually retrieves each of one or more records from storage according to whether a corresponding element of the bitmap has an active value;
    running, concurrently with the first primary task, a second background task that executes a same query as the first primary task and that updates the bitmap by setting an inactive value to the element of the bitmap corresponding to any record that does not satisfy at least a portion of the selection criteria, wherein running the second background task includes:
        scanning a column of the table using an index built over the column; the portion of the selection criteria relating to record values within the column;
        determining a set of records whose record values within the column do not satisfy the portion of the selection criteria; and
    concurrently with the first primary task individually retrieving records from the storage having corresponding active value bitmap elements, changing the corresponding bitmap element to an inactive value for each record within the set of records; and
    continuing to run the first primary task until all records from the table, having a corresponding active value bitmap element, have been retrieved from the storage, including accessing the bitmap in the first primary task before at least one element is set to an inactive value by the second background task to determine whether to retrieve a record from the storage.

2. The method according to claim 1, wherein the step of running the first primary task includes the steps of:
    determining if a retrieved record satisfies the selection criteria; and
    returning, as part of a query result set, the retrieved record if the selection criteria is satisfied.

3. The method according to claim 1, wherein the step of running the first primary task includes the steps of:
    discarding any record having a corresponding bitmap element which has an inactive value, by not retrieving that record from the storage.

4. The method according to claim 1, wherein a first order in which the one or more records is retrieved differs from a second order in which the column of the table is scanned.

5. The method according to claim 1, further comprising the steps of:
    collecting statistics relating to performance of executing the query; and
    generating a recommendation presented to a user for creating a permanent index based on the statistics.

* * * * *